United States Patent [19]
Jones, Jr. et al.

[11] Patent Number: 5,192,083
[45] Date of Patent: Mar. 9, 1993

[54] SINGLE RING SECTOR SEAL

[75] Inventors: Henry F. Jones, Jr.; Wilbur Shapiro, both of Schenectady, N.Y.

[73] Assignee: Dresser-Rand Company, Corning, N.Y.

[21] Appl. No.: 821,789

[22] Filed: Jan. 16, 1992

[51] Int. Cl.$^5$ .................................................. F16J 9/00
[52] U.S. Cl. .................................. 277/29; 277/27; 277/53; 277/173; 277/192
[58] Field of Search ............... 277/27, 29, 173–176, 277/192, 199, 53, 70

[56] References Cited

U.S. PATENT DOCUMENTS

| | | | |
|---|---|---|---|
| 3,377,073 | 4/1968 | Harney | 277/173 |
| 3,575,424 | 4/1971 | Taschenberg | 277/27 |
| 3,594,010 | 7/1971 | Warth | 277/53 |
| 3,711,104 | 1/1973 | Henry | 277/58 |
| 3,874,678 | 4/1975 | Potter | 277/29 |
| 4,070,221 | 1/1978 | Anthony | 156/245 |
| 4,076,259 | 2/1978 | Raimondi | 277/27 |
| 4,180,273 | 12/1979 | Takagi et al. | 277/154 |
| 4,504,069 | 3/1985 | Stenlund | 277/174 |
| 4,776,261 | 10/1988 | Larson | 92/174 |
| 4,792,146 | 12/1988 | Lebeck et al. | 277/26 |
| 4,838,559 | 6/1989 | Guardiani et al. | 277/3 |
| 5,002,288 | 3/1991 | Morrison et al. | 277/27 |
| 5,014,999 | 5/1991 | Makhobey | 277/175 |
| 5,015,000 | 5/1991 | Perini | 277/27 |
| 5,039,115 | 8/1991 | Hebert et al. | 277/192 |

Primary Examiner—William A. Cuchlinski, Jr.
Assistant Examiner—Daniel G. DePumpo
Attorney, Agent, or Firm—Richards, Medlock & Andrews

[57] ABSTRACT

A single ring sector seal (10) has multiple arcuate sectors (12a, 12b, 12c) arranged circumferentially around a rotating shaft and in floating engagement with a seal housing. Each sector (12) engages each adjacent sector (12) with a slot seal (40) and overlapping joint (38) therebetween to deter leakage. A protruding ridge (36) on each sector (12) engages a low pressure end cover (18) to form a secondary seal. Spring balance seals (28) provide a further seal between the high pressure chambers (20b, 20c) and the chamber (20a) which can be vented while the shaft is rotating and pressurized when the shaft is stationary. Each sector (12) is radially, axially and moment balanced.

20 Claims, 3 Drawing Sheets

SINGLE RING SECTOR SEAL

TECHNICAL FIELD OF THE INVENTION

The present invention relates to a single ring sector seal, and more specifically to a sector seal for use around a rotating shaft in high-pressure applications.

BACKGROUND OF THE INVENTION

Packings or seals include those means used to prevent or minimize leakage of a fluid through mechanical clearances in either the static or dynamic state. Dynamic seals include all packings that operate on moving surfaces. In functioning to retain fluid under pressure, the dynamic seal carries the hydraulic load. When no pressure exists, the packing is mechanically loaded as by a spring or by its own resiliency. Dynamic packings therefore operate as bearings, thereby indicating the need for lubrication to serve as both a separating film and a coolant. The presence of a film is vital for satisfactory service life for both the seal and the shaft. However, the film also leads to leakage across the seal.

Dynamic seals are generally classified in three ways. First, they are classified on the basis of the shape of the surfaces: cylindrical, conical, spherical or flat. Cylindrical packings are in turn classified according to whether they pack on the outer perimeter, as in piston packings, or the inside perimeter, as on rods or shafts. Second, seals are classified on the type of motion involved; rotary, oscillating, reciprocating, or helical. Last, seals are classified on the basis of their (non) performance: automatic or nonautomatic. For example, soft or jamb packings are tightened by external means, generally a gland, while automatic-performed seals are self-tightening under pressure.

An example of a pressure balanced circumferential seal assembly is provided by U.S. Pat. No. 3,575,424 to Taschenberg. This Taschenberg patent discloses a segmental circumferential shaft seal purported to provide both axial and radial balance by using the distribution of fluid pressure forces applied to opposing surfaces of the seal. The Taschenberg seal also uses radial forces acting on the end gaps between the sealing ring segments, which would otherwise tend to unseat the sealing ring, thus causing excessive leakage across the seal. Taschenberg balances the resultant forces to permit the axial and radial seating forces to slightly exceed the axial and radial lifting forces, thus creating a seating bias. A second seal ring or backup ring in the seal assembly forms a second sealing interface with the segmental primary seal ring. A bellows diaphragm connects the secondary seal with a second shoulder of the seal assembly adjacent the high pressure side, thereby preventing the passage of high pressure fluid to an area surrounding the outer circumference of the primary and secondary seals. Passages within the seal assembly permit the flow of high pressure fluid or the flow of low pressure fluid to achieve pressure balancing. Thus, Taschenberg uses two secondary seals, one of which is a bellows which limits pressure capability. Furthermore, Taschenberg relies on rubbing contact rather than a fluid film to achieve a seal between the primary seal element and the rotating shaft.

A need exists for a circumferential sector seal with high pressure capability. Such a seal should use fluid-film lubrication between the seal and the rotating shaft. Individual sector movement should allow for shaft vibrations, and centrifugal and thermal shaft excursions without contact or wear. The sector seal should be bidirectional in operation and allow unlimited axial movement of the shaft. The sector seal should also be capable of taking the entire pressure differential across a single axial length.

SUMMARY OF THE INVENTION

The present invention involves a single ring sector seal for use around a rotating shaft. The seal is comprised of a seal housing surrounding multiple arcuate sectors arranged circumferentially about the shaft in the form of a single seal ring facing the shaft. The sectors are joined together such that leakage paths between sectors are blocked. The seal is typically situated between a high pressure side and a low pressure side. The high pressure forces the sectors toward the low pressure side where an axially protruding rim on that axial end of each sector contacts the housing and forms a secondary interface seal between the sectors and the housing adjacent to the low pressure end of the housing. Each sector is pressure balanced in the axial direction by balance holes extending at least generally axially through each sector.

During shaft rotation, a hydrostatic-hydrodynamic fluid film is forced between the rotating shaft and the seal sectors, preventing contact and consequential wear or damage. Since the average pressure in the film is less than the high pressure being sealed, closure of the seal with consequent shaft contact would occur unless the pressure on the outer periphery of the seal is relieved. Outer periphery pressure relief is accomplished by using a vent valve to reduce the pressure in an annular chamber formed by the seal housing and an outer circumferential portion of the single ring sector seal. The outer circumferential portions of the sectors on either side of this vented chamber are exposed to fluid from the high pressure end, with the axial lengths of these exposed portions being selected so that the sectors are force balanced radially, and moment balanced about the secondary interface between the annular rim and the housing. To avoid high pressure gas leaking into the vented chamber, two spring balance seals are incorporated. These spring balance seals are complete rings that make circumferential contact with all of the sectors and the housing. At the joints between adjacent sectors, slot seals are installed to prevent high pressure fluid leaking to the vented region. At the inner circumference of the sector ring seal, adjacent sectors can be joined together with an overlapping taper to prevent leakage.

During shutdown, when the shaft is not rotating, high pressure gas can be introduced into the vented chamber to provide a positive closure of the sectors against the shaft. Thus, zero speed shut-off can be accomplished. Prior to renewed shaft rotation, the supply of high pressure gas to the vented chamber is closed off and the vent valve is opened.

The present invention provides a number of advantages over prior art seals. It is a circumferential seal that can operate at low clearance to limit leakage, by virtue of movable circumferential sectors, and simultaneously seal against high pressure differentials, a limitation of conventional sectored ring seals. Other advantages include sector movement that allows for shaft vibrations, and centrifugal or thermal shaft excursions without wear. Also, the present invention is bi-directional in operation, requiring no preferred rotation direction. The present sector seal also allows unlimited axial shaft movement while sealing against high pressure differentials. The single ring seal provides for simpler design and manufacture than seals employing a secondary ring seal as well as a primary sector ring seal. The application of high pressure fluid to the vent chamber during shutdown permits a more positive closure with the shaft than would be obtained by the garter spring alone.

BRIEF DESCRIPTION OF THE DRAWINGS

For a more complete understanding of the present invention, and for further details and advantages thereof, reference is now made to the following detailed description taken in conjunction with the accompanying drawings in which.

DETAILED DESCRIPTION OF THE INVENTION

Figure 1:
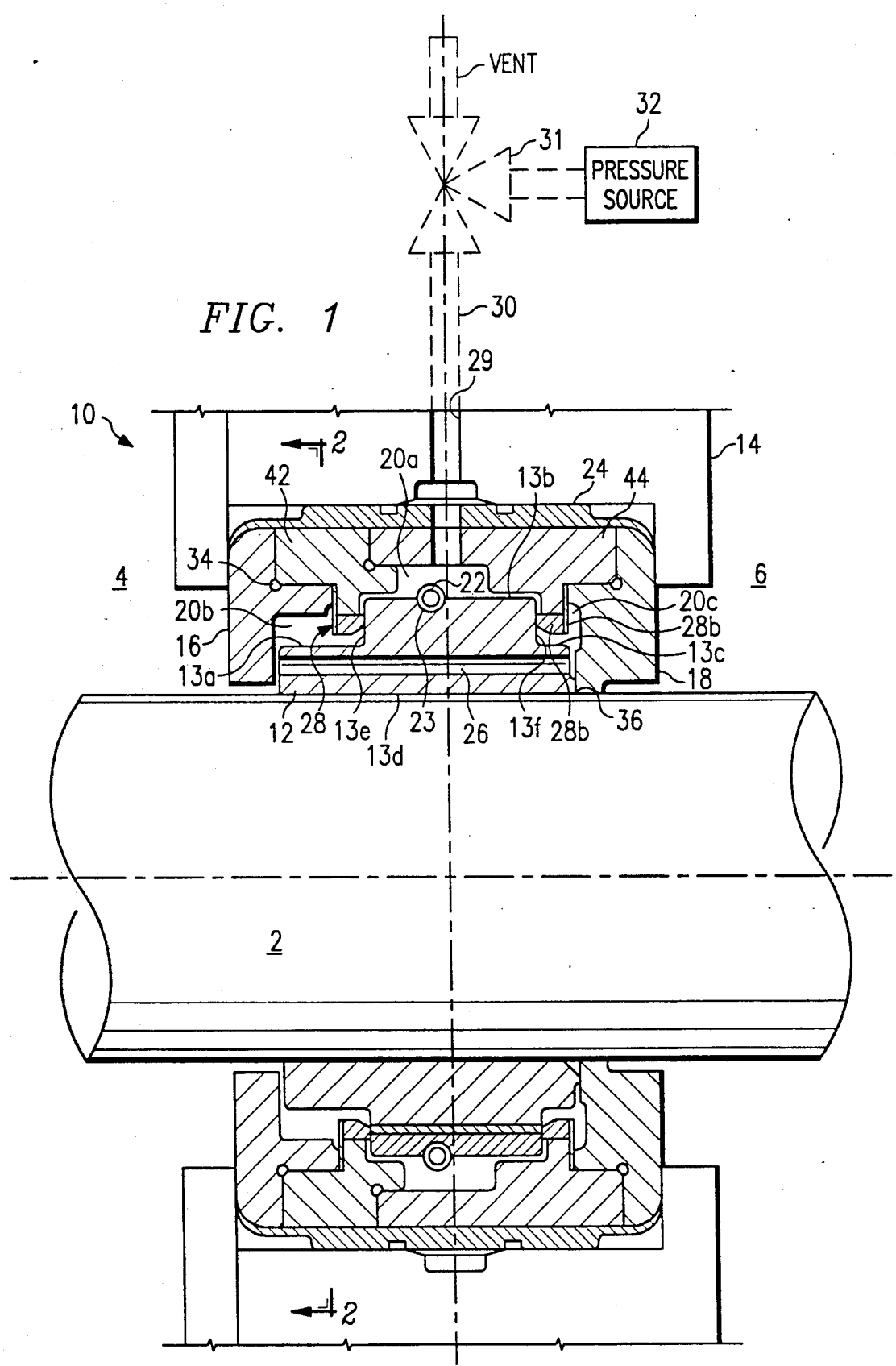
FIG. 1 is an axial sectional view of the present single ring sector seal.

The present invention is a single ring sector seal that overcomes many of the disadvantages found in the prior art. Referring to FIG. 1, a sector seal 10 embodying the present invention is disclosed. Sector seal 10 comprises multiple arcuate sectors 12 floating in a seal housing and surrounded by a garter spring 22. The arcuate sectors 12 are adapted to be circumferentially positioned about the shaft 2 and joined together to collectively form a single ring sector seal. Sector seal 10 is positioned between the high pressure side 4 of the machinery housing 14 and the low pressure side 6 of the machinery housing 14. The sector seal 10 is a single ring sector seal because the seal takes the complete pressure drop across a single axial length of a sector.

Lubrication between the sectors 12 and the shaft 2 is provided by the high pressure fluid being sealed. The small gap (100-500 microinches) between the single ring sector seal 10 and the shaft 2 provides a low leakage seal in the form of a fluid film between them during the rotation of the shaft.

Figure 2:
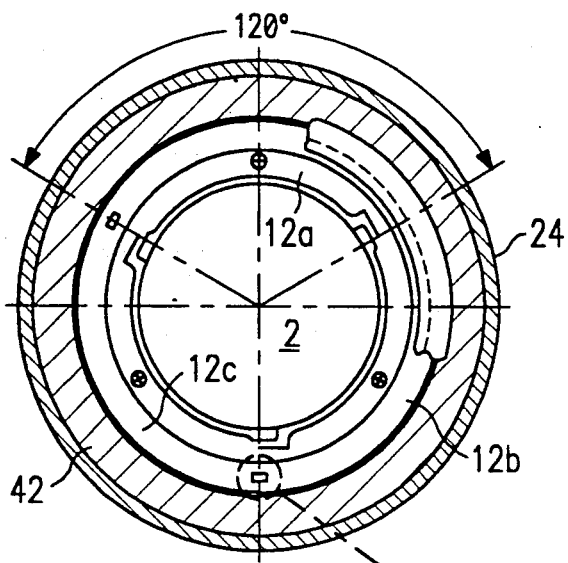
FIG. 2 is a radial sectional view along line 2—2 in FIG. 1.

Sectors 12 are shown collectively surrounding shaft 2. At a minimum, at least two sectors should be used. Typically, three sectors 12a, 12b, 12c are used, as illustrated in FIG. 2, with each sector 12 being interconnected with the two sectors immediately adjacent thereto. Each sector can be made of carbon or a suitably coated metal. A retainer, e.g. a garter spring 22 can be positioned in an annular spring groove 23 formed in the exterior surface of each of the sectors 12 to provide radially inwardly directed forces on the sector seal to hold the sectors 12 together in the absence of any hydraulic closing forces.

A seal housing surrounds the sectors 12 and is rigidly connected to machinery housing 14 through which the shaft 2 passes. The seal housing is typically steel and can be comprised of two or more housing elements to facilitate assembly. In the illustrated embodiment the seal housing comprises a high pressure seal housing 42 rigidly attached to a low pressure seal housing 44, a high pressure end cover 16 rigidly attached to the high pressure seal housing 42, a low pressure end cover 18 rigidly attached to the low pressure seal housing 44, and an assembly sleeve 24 which encircles and is rigidly attached to housings 42, 44 and end covers 16, 18. Undercuts 34 can be located at the intersection of seal housing elements.

A passage 29 extends from the vented chamber 20a through assembly sleeve 24, housing 44 and conduit 30 to a two-way valve 31. One position of valve 31 can be utilized to connect vent chamber 20a to a source 32 of elevated fluid pressure while the shaft 2 is stationary, and another position of valve 31 can be used to connect vent chamber 20a to a vent while the shaft 2 is rotating. The vent can be to the atmosphere or to another suitably low pressure environment. During rotation of the shaft 2, the venting of chamber 20a maintains the fluid pressure in chamber 20a substantially below the fluid pressure in high pressure chambers 20b and 20c. The pressure in vent chamber 20a during operation can be maintained at a value which is less than the pressure on the low side 6 of the machinery housing.

Each sector 12 is defined by an annular inner sealing surface 13d adjacent to the shaft 2 and three annular outer surface areas 13a, 13b, and 13c which are spaced radially outwardly from the sealing surface 13d. The three outer surface areas 13a, 13b and 13c, which constitute first, second and third annular balance portions, are spaced along the longitudinal length of the sector with balance portion 13b being intermediate balance portions 13a and 13c. The outer diameter of intermediate balance portion 13b is greater than the outer diameters of end balance portions 13a and 13c, thereby forming radially extending annular shoulders 13e and 13f joining the intermediate balance portion 13b to the end balance portions 13a and 13c.

Sectors 12 are in floating engagement with inner surfaces of the seal housing. Annular spring balance seals 28, each comprising a seal ring 28a and an annular spring 28b, are rigidly attached to both high pressure housing 42 and low pressure housing 44 such that each seal ring 28a is in sliding engagement with a respective one of the radially extending shoulders of the intermediate portion 13b of each sector 12. The vent chamber 20a is defined by the seal housing, the second balance portion 13b of each sector, and the two spring balance seals 28. A first high pressure chamber 20b can be defined between the first balance portion 13a and the high pressure seal housing 42 and high pressure end cover 16. A second high pressure chamber 20c can be defined between the low pressure housing 44, the low pressure end cover 18, and the third balance portion 13c of each of the sectors 12.

The first high pressure chamber 20b communicates with the second high pressure chamber 20c by means of balance passageway 26 which extend at least generally longitudinally through each sector 12. The pressure within the first and second high pressure chambers 20b, 20c is isolated from the pressure in vent chamber 20a by spring balance seals 28.

Each sector 12 also has an annular rim segment 36 which protrudes longitudinally from the end of the sector adjacent to the low pressure end plate 18 and is dimensioned to contact low pressure end plate 18 such that the rim segments 36 collectively form a interface seal with low pressure end plate 18.

Figure 3:
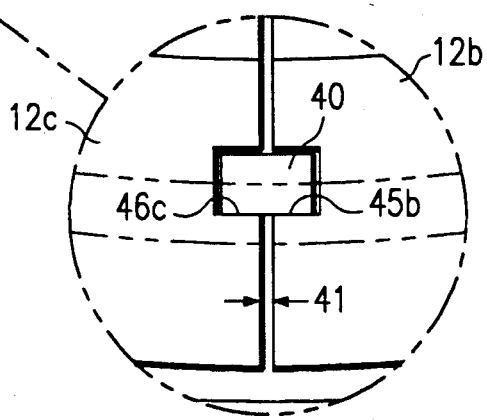
FIG. 3 is a detail view of the interface between adjacent sectors.

FIGS. 2 and 3 illustrate a sectional view across line 2—2 in FIG. 1 of single ring sector seal 10. High pressure housing 42 is shown encircled by the assembly sleeve 24. In turn, the high pressure housing 42 is shown encircling three sectors 12a, 12b, and 12c. Each sector is shown covering a 120° arc around the circumference of the shaft 2. Spring balance seal 28 is partially shown in cutaway. A gap 41 exists between each pair of adjacent sectors 12, as shown in FIG. 3. This gap 41 is sealed by the insertion of a slot seal 40 into the slot seal groove 45b in the first edge of sector 12b and the complementary slot seal groove 46c in the adjacent second edge of sector 12c. The slot seal 40 thereby inhibits leakage of the fluid in high pressure chambers 20b and 20c through the sector gap 41 into the vent chamber 20a. The slot seals 40 extend longitudinally from one spring balance seal 28 to the other spring balance seal 28 in order to isolate the vent chamber 20a.

Figure 4:
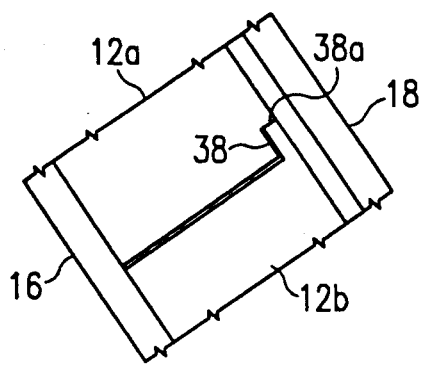
FIG. 4 provides a flat view of the interface between two adjacent sectors.
Figure 5:
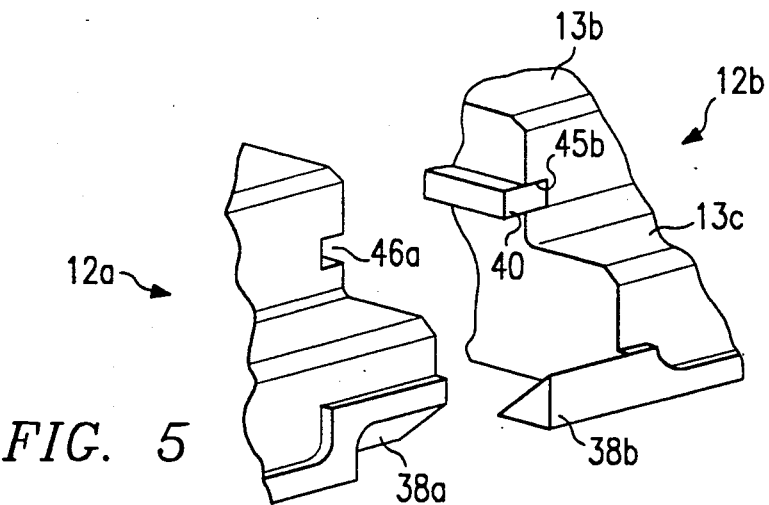
FIG. 5 provides an exploded perspective view of the interface between the two adjacent sectors.

FIGS. 4 and 5 illustrate the intersection between a pair of adjacent sectors 12a, 12b, with FIG. 4 being an interior view of the intersection of sectors 12a and 12i b. Sectors 12a and 12b are shown with an overlapping tongue and groove sector joint 38. Sector joint tongue 38b on sector 12b fits into a complementary groove 38a in the adjacent sector 12a. Slot seal 40 is also shown engaged in the slot seal groove 46a in the second edge of sector 12a and in the slot seal groove 45b in the first edge of sector 12b.

Figure 6:
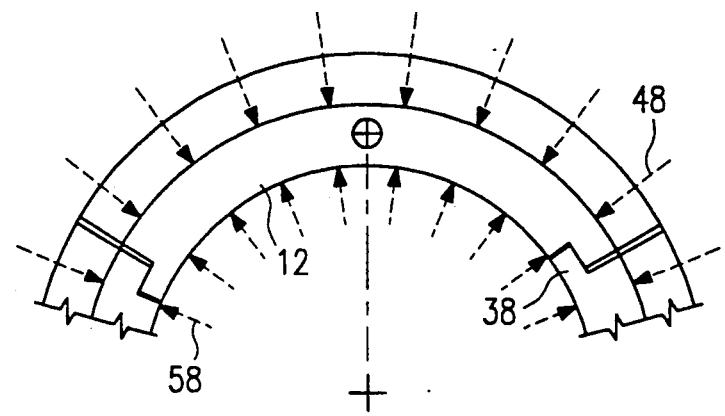
FIG. 6 illustrates the radial force distribution on the sectors.
Figure 7:
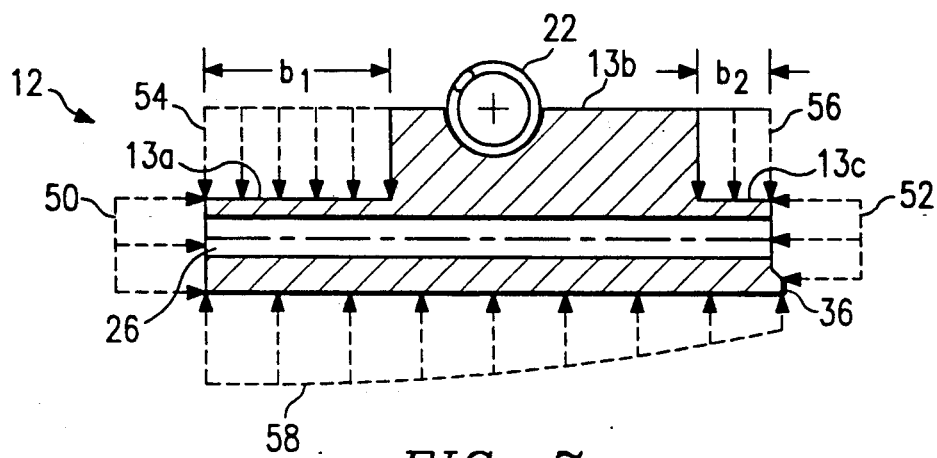
FIG. 7 illustrates both axial and radial forces applied to the sectors.

FIGS. 6 and 7 illustrate the pressure distribution across a sector 12. As seen in FIG. 6, the radial pressure distribution is shown by inwardly directed arrows 48 and outwardly directed arrows 58. The radial pressure across a sector 12 along the longitudinal axis is shown in FIG. 7. Pressure 58 is distributed across the inner surface of sector 12. This radially outwardly directed pressure 58 is balanced by radially inwardly directed pressures 54 and 56. The width "$b_1$" of annular portion 13a and the width "$b_2$" of annular portion 13c are selected to force and moment balance the sector 12. Axial forces 50 and 52 are slightly unbalanced due to the area of the interface seal at rim 36 when the sector is forced against the low pressure side 6. Thus, a force differential across the sector 12 towards the low pressure end exists, despite the balanced pressures 50, 52, due to the greater end surface area exposed to pressure 50. During shutdown, high pressure gas is introduced into the vented chamber 20a to provide a positive closure of the sectors 12 against the shaft 2. Prior to start-up, the valve 31 is actuated to discontinue the supply of the high pressure fluid to chamber 20a and to connect chamber 20a to the vent.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

We claim:

1. A single ring sector seal assembly for mounting around a shaft for sealing against the passage of high pressure fluid along said shaft from a high pressure side of said seal assembly to a low pressure side of said seal assembly, said seal assembly comprising:

a seal housing adapted to be circumferentially located around said shaft;

at least two arcuate sectors adapted to be circumferentially positioned about said shaft and joined together to collectively form a single ring sector seal having an annular outer surface and an annular inner seal surface, with a fluid film between said annular inner seal surface and said shaft during the motion of said shaft, said sectors being encircled by and in floating relationship to said seal housing, said annular outer surface comprising first, second, and third annular portions, said second annular portion being positioned between said first and third annular portions;

an annular vent chamber formed by said seal housing and said second annular portion and isolated from said high pressure side of said seal assembly; and means to vent said vent chamber to a suitable low pressure environment in order to maintain the pressure in said vent chamber substantially below the pressure of said high pressure side of said seal assembly while said shaft is in motion, thereby preventing contact of said sectors with the moving shaft.

2. A single ring sector seal assembly in accordance with claim 1, further comprising retaining means positioned around said sectors to provide radially inwardly directed forces on the sector seal to hold the sectors together in the absence of any hydraulic closing forces.

3. A single ring sector seal assembly in accordance with claim 1, wherein the outer diameter of said second annular portion is greater than the outer diameters of said first and third annular portions, thereby providing annular shoulders which extend at least generally radially between said second annular portion and said first and third annular portions; and further comprising first and second annular seals positioned between said single ring sector seal and said seal housing, each of said first and second annular seals being in sliding contact with a respective one of said annular shoulders.

4. A single ring sector seal assembly in accordance with claim 3, wherein said seal housing further comprises a high pressure end plate rigidly secured to the high pressure end of said seal housing, a low pressure end plate rigidly secured to the low pressure end of said seal housing; an assembly sleeve circumferentially encompassing said seal housing, said low pressure end plate, and said high pressure end plate.

5. A single ring sector seal assembly in accordance with claim 4, wherein each of said sectors further comprises a rim protruding longitudinally from the end of the sector adjacent to said low pressure end plate to sealingly engage said low pressure end plate.

6. A single ring sector seal assembly in accordance with claim 3, wherein said first and second annular seals are first and second annular spring balance seals, and wherein said vent chamber comprises a volume defined by the seal housing, said second annular portion, and said first and second annular spring balance seals.

7. A single ring sector seal assembly in accordance with claim 6, further comprising a first high pressure chamber defined by said seal housing and said first annular portion, and a second high pressure chamber defined by said seal housing and said third annular portion, wherein said first and second high pressure chambers are isolated from said vent chamber by said first and second annular spring balance seals.

8. A single ring sector seal assembly in accordance with claim 7, wherein said first and second high pressure chambers are axially pressure balanced by at least one of said sectors having a balance passageway extending at least generally longitudinally therethrough to connect said first and second high pressure chambers to each other.

9. A single ring sector seal assembly in accordance with claim 1, further comprising means for supplying fluid under pressure to said vent chamber when said shaft is stationary.

10. A single ring sector seal assembly in accordance with claim 1, wherein said sectors are dimensioned to be at least substantially axially, radially, and moment balanced.

11. A single ring sector seal assembly in accordance with claim 1, wherein each of said sectors is joined to each sector immediately adjacent thereto by a slot seal such that leakage paths between sectors are blocked.

12. A single ring sector seal-assembly for mounting around a shaft for sealing against the passage of high pressure fluid along said shaft from a high pressure side of said seal assembly to a low pressure side of said seal assembly, said seal assembly comprising:
  a seal housing adapted to be circumferentially located around said shaft;
  at least two arcuate sectors adapted to be circumferentially positioned about said shaft and joined together to collectively form a single ring sector seal having a fluid film between said single ring sector seal and said shaft during the movement of said shaft, said sectors being encircled by and in floating relationship to said seal housing;
  an annular vent chamber formed by said seal housing and an outer circumferential portion of said single ring sector seal and isolated from said high pressure side of said seal assembly;
  means to vent said vent chamber to a suitable low pressure environment in order to maintain the pressure in said vent chamber substantially below the pressure of said high pressure side of said seal assembly while said shaft is in motion to thereby prevent contact of said sectors with the moving shaft; and
  means for supplying fluid under pressure to said vent chamber when said shaft is stationary to thereby provide a positive closure of said sectors against the stationary shaft.

13. A single ring sector seal assembly in accordance with claim 12, further comprising first and second annular spring balance seals attached to the seal housing, said first and second annular spring balance seals being in sliding contact with said sectors.

14. A single ring sector seal assembly in accordance with claim 12, wherein each of said sectors comprises:
  a seal surface adjacent to said shaft; and
  an outer sector surface spaced radially outwardly from said seal surface, said outer sector surface having first, second, and third balance portions spaced along the longitudinal length of the sector, the second balance portion being located between the first and third balance portions and being said outer circumferential portion.

15. A single ring sector seal assembly in accordance with claim 14, wherein the outer diameter of said second balance portion is greater than the outer diameters of said first and third balance portions, thereby providing annular shoulders which extend at least generally radially between said second balance portion and said first and third balance portions; and further comprising first and second annular spring balance seals attached to said seal housing, each of said first and second annular spring balance seals being in sliding contact with said outer sector surface at a location between said second balance portion and a respective one of said first and third balance portions.

16. A single ring sector seal assembly in accordance with claim 15, further comprising a garter spring positioned around said sectors.

17. A single ring sector seal assembly in accordance with claim 15, further comprising a first high pressure chamber defined by said seal housing, the first balance portion of each of said sectors, and the first annular spring balance seal; and a second high pressure chamber defined by said seal housing, the third balance portion of each of said sectors, and said second annular spring balance seal; wherein said first and second high pressure chambers are isolated from said vent chamber by said first and second annular spring balance seals.

18. A single ring sector seal assembly in accordance with claim 17, wherein said first and second high pressure chambers are pressure balanced by each of said sectors having a balance passageway extending at least generally longitudinally therethrough to connect said first and second high pressure chambers to each other.

19. A single ring sector seal assembly in accordance with claim 18, wherein adjacent sectors have complementary slot seal grooves in their confronting faces with a slot seal positioned in the complementary slot seal grooves.

20. A single ring sector seal assembly in accordance with claim 19, further comprising a garter spring positioned around said sectors.

* * * * *